US012687822B2

(12) United States Patent
Ishitani et al.

(10) Patent No.: US 12,687,822 B2
(45) Date of Patent: Jul. 21, 2026

(54) LEARNING CONTROL DEVICE, LEARNING CONTROL METHOD, AND PROGRAM PRODUCT UTILIZING FEEDBACK SIGNALS

(71) Applicant: KABUSHIKI KAISHA TOSHIBA, Tokyo (JP)

(72) Inventors: Makihiko Ishitani, Kawasaki Kanagawa (JP); Yoshiyuki Ishihara, Kawasaki Kanagawa (JP); Shinji Takakura, Yokohama Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 349 days.

(21) Appl. No.: 18/454,205

(22) Filed: Aug. 23, 2023

(65) Prior Publication Data

US 2024/0248437 A1     Jul. 25, 2024

(30) Foreign Application Priority Data

Jan. 25, 2023     (JP) ................................. 2023-009335

(51) Int. Cl.
 G05B 13/02          (2006.01)
 G05B 23/02          (2006.01)
(52) U.S. Cl.
 CPC ..... G05B 13/0265 (2013.01); G05B 23/0248 (2013.01); *G05B 2223/02* (2018.08)
(58) Field of Classification Search
 CPC ............ G05B 13/0265; G05B 23/0248; G05B 2223/02

(Continued)

(56) References Cited

U.S. PATENT DOCUMENTS

| 5,907,450 | A | 5/1999 | Ishikawa et al. |
| 2008/0059038 | A1* | 3/2008 | Yoshida ............... G05B 13/024 |
| | | | 701/99 |

(Continued)

FOREIGN PATENT DOCUMENTS

| JP | H5-89077 A | 4/1993 |
| JP | H6-119003 A | 4/1994 |

(Continued)

OTHER PUBLICATIONS

Japan Patent Office, Decision to Grant a Patent in JP App. No. 2023-009335 (Jun. 3, 2025).

(Continued)

*Primary Examiner* — Jigneshkumar C Patel
(74) *Attorney, Agent, or Firm* — Finnegan, Henderson, Farabow, Garrett & Dunner, LLP

(57) ABSTRACT

A learning control device according to one embodiment includes a memory and a hardware processor. The memory stores a correction value to be used in a learning trial. The processor generates a feedback signal on the basis of a tracking error for a target state of a control target. The feedback signal is used for causing an operation result state of the control target to track the target state. The feedback signal is generated such that a control target waveform of transition of an output signal representing the operation result state becomes a waveform obtained by calculating a coefficient on the whole of a base control target waveform. The processor outputs, to a feedback communication path, a calculation result obtained by calculating the coefficient on the correction value. The processor updates the correction value stored in the memory in accordance with a signal communicated through the feedback communication path.

6 Claims, 9 Drawing Sheets

(58) Field of Classification Search
USPC ........................................................ 700/47
See application file for complete search history.

(56) References Cited

U.S. PATENT DOCUMENTS

| | | | |
|---|---|---|---|
| 2013/0166174 A1 * | 6/2013 | Nanba ................. | F02D 41/2448 |
| | | | 701/103 |
| 2018/0267499 A1 * | 9/2018 | Tsuneki ................. | G06N 20/00 |
| 2018/0374001 A1 * | 12/2018 | Namie ................. | G05B 13/041 |
| 2019/0227502 A1 * | 7/2019 | Nakamura ......... | G05B 13/0265 |
| 2020/0005499 A1 * | 1/2020 | Tsuneki ................ | G06T 11/206 |
| 2021/0373508 A1 | 12/2021 | Hagihara | |
| 2023/0195844 A1 | 6/2023 | Ishitani et al. | |

FOREIGN PATENT DOCUMENTS

| JP | H9-146645 A | 6/1997 |
|---|---|---|
| JP | 2001-126421 A | 5/2001 |
| JP | 2021-189581 A | 12/2021 |
| JP | 2023-91277 A | 6/2023 |

OTHER PUBLICATIONS

Jun Ishikawa et al., "A Stability Analysis on a Learning Control for Hard Disk Drives," Japan Soc. Mech . Eng'rs. 74th Ord. Session of the Diet Lecture Memoirs (IV), No. 97-3, pp. 400-401 (1997).
Muhammad Arif et al., "Model Based Iterative Learning Control (MILC) for Uncertain Dynamic Non-Linear Systems," Graduate School of Information Sciences, 14th World Congress of IFAC, pp. 1469-1474 (1999).

* cited by examiner

SIMULATION RESULT OF CONVENTIONAL TECHNOLOGIES

NUMBER OF SAMPLES

SIMULATION RESULT OF PRESENT EMBODIMENT

NUMBER OF SAMPLES

EXPERIMENTAL RESULT OF CONVENTIONAL TECHNOLOGIES

NUMBER OF SAMPLES

EXPERIMENTAL RESULT OF PRESENT EMBODIMENT

NUMBER OF SAMPLES

LEARNING CONTROL DEVICE, LEARNING CONTROL METHOD, AND PROGRAM PRODUCT UTILIZING FEEDBACK SIGNALS

CROSS-REFERENCE TO RELATED APPLICATIONS

This application is based upon and claims the benefit of priority from Japanese Patent Application No. 2023-009335, filed on Jan. 25, 2023; the entire contents of which are incorporated herein by reference.

FIELD

Embodiments described herein relate generally to a learning control device, a learning control method, and a program product.

BACKGROUND

A learning control device as a digital control device has been known. Such a learning control device repeatedly controls a control target in accordance with a correction value stored in a learning memory. Additionally, the learning control device sequentially updates a correction value to be used in the next learning trial, by using a tracking error between a target value and an output value of the control target in the last learning trial, thereby improving control performance for each iteration.

In learning control, in a case of using the same learning memory, different learning trials share the same control target waveform representing transition of an output signal output from the control target.

Therefore, when causing the control target to output different control target waveforms, conventional technologies are required to prepare a plurality of learning memories and perform a learning trial for each of the learning memories. Preparing learning memories for multiple types of control target waveforms may increase the number of learning memories needed and increase the number of learning trials by learning control using each of the learning memories.

2

Figure 10A:
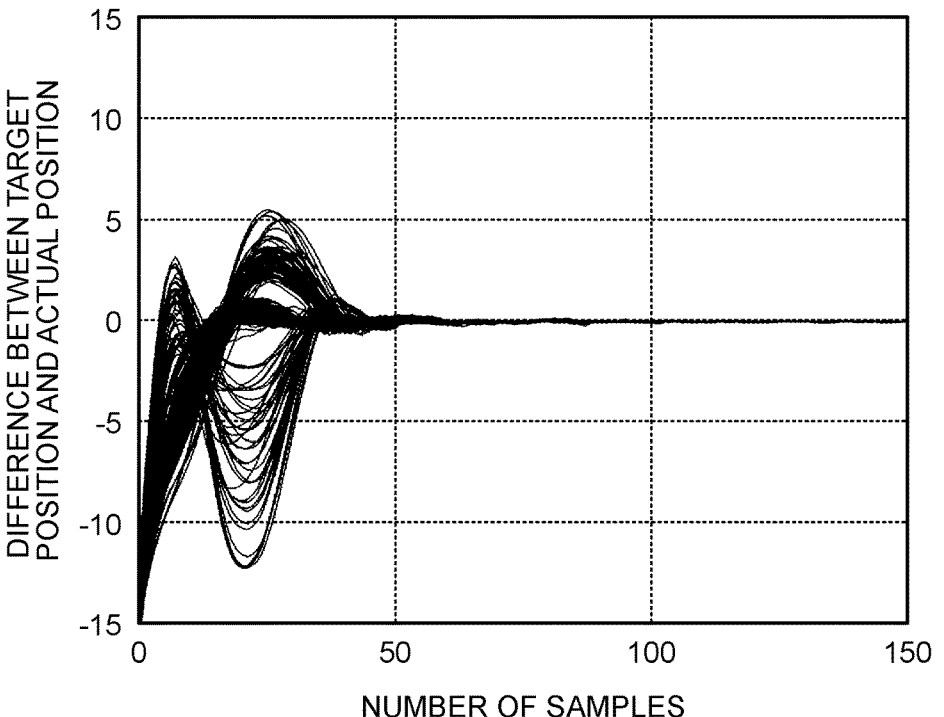
Figure 10B:
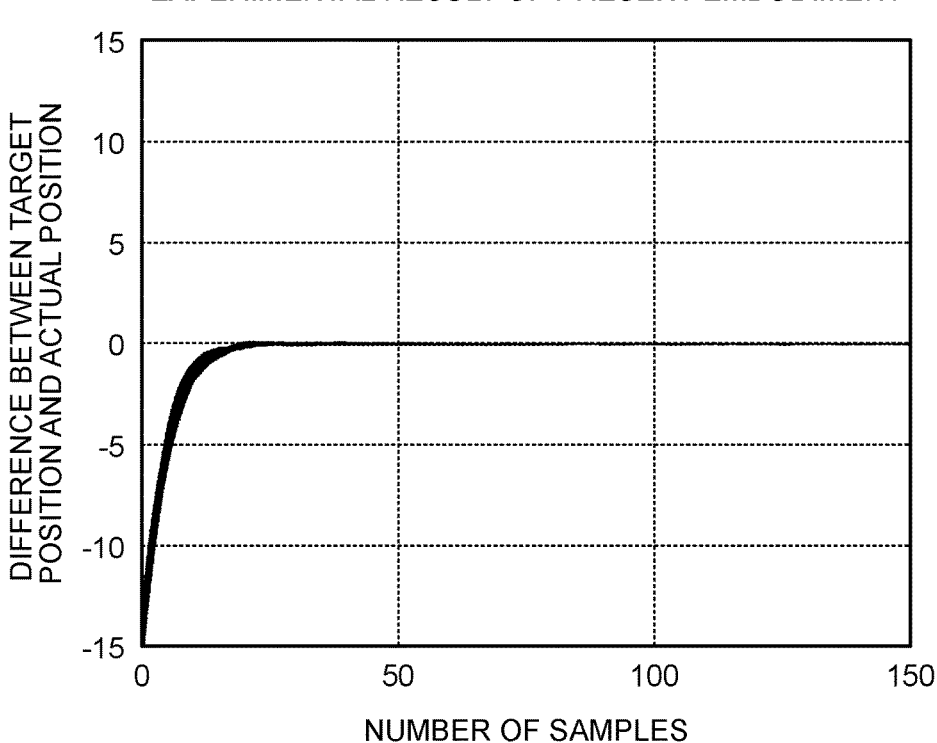

FIG. 10A is an explanatory diagram of an effect of the learning control device;

FIG. 10B is an explanatory diagram of an effect of the learning control device; and FIG. 11 is a hardware configuration diagram.

DETAILED DESCRIPTION

A learning control device includes a learning memory and a hardware processor connected to the learning memory. The leaning memory is configured to store a correction value to be used in a learning trial. The hardware processor is configured to function as a feedback control unit, a feedback control unit, and an update unit. The feedback control unit generates a feedback signal on the basis of a tracking error for a target state of a control target and output the feedback signal. The control target operates in response to an input control signal and outputs an operation result state during the learning trial. The feedback signal is used for causing the operation result state of the control target to track the target state. The feedback signal is generated such that a control target waveform represented by transition of an output signal representing the operation result state becomes a waveform obtained by calculating a coefficient on the whole of a base control target waveform determined in advance. The correction unit outputs a calculation result obtained by calculating the coefficient on the correction value, to a feedback communication path by which the tracking error according to the operation result state of the control target is input to the feedback control unit. The update unit updates the correction value stored in the learning memory in accordance with a signal communicated through the feedback communication path.

A learning control device, a learning control method, and a program product of the present embodiment will be described in detail below with reference to the accompanying drawings. The same functional parts are described herein with the same reference signs.

Figure 1:
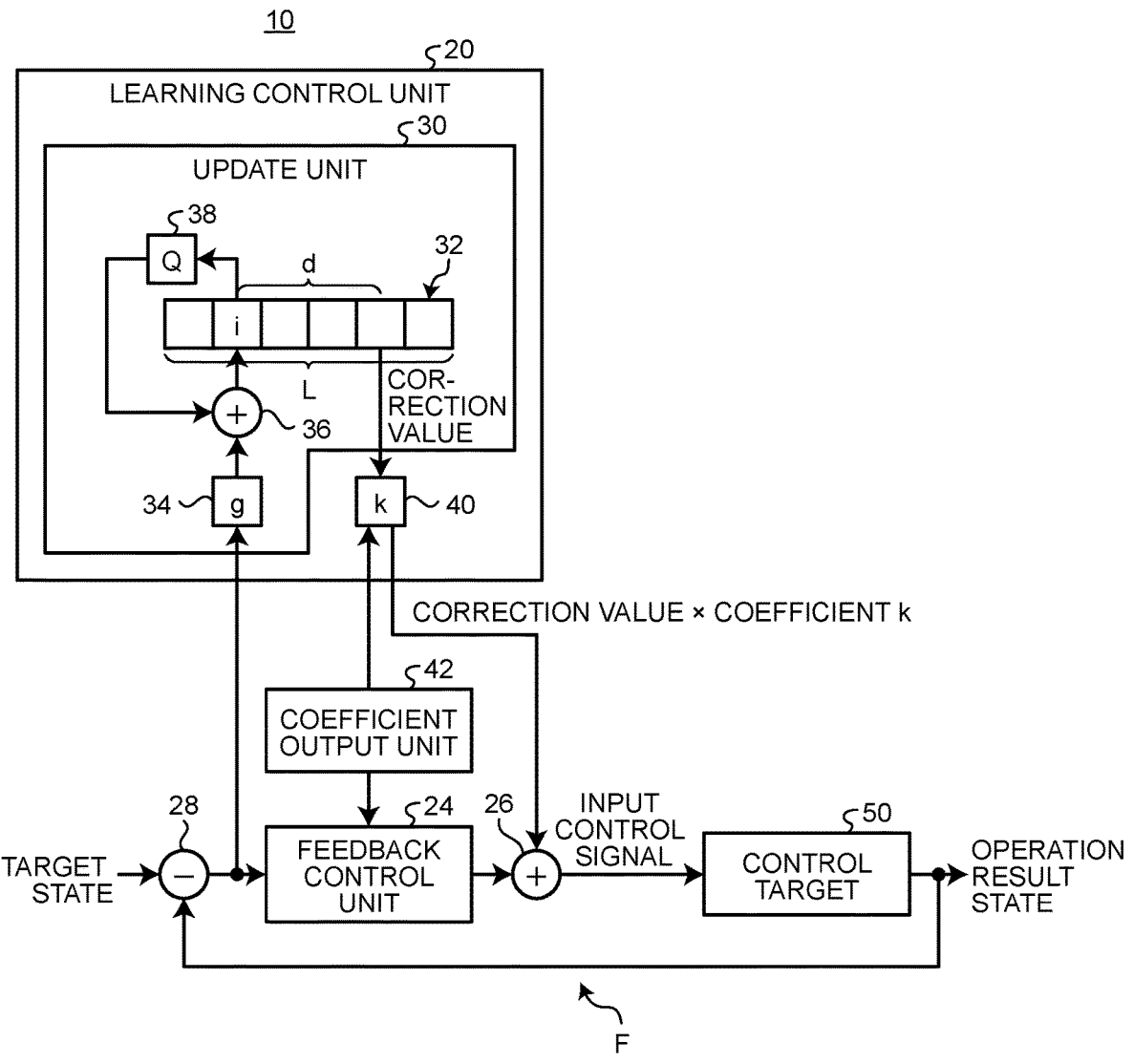
FIG. 1 is a schematic diagram of a learning control device.

FIG. 1 is a schematic diagram of an example of a learning control device 10 according to the present embodiment.

The learning control device 10 is a digital control device that performs learning control by repeatedly controlling a control target 50 and sequentially updating a correction value to improve control performance with each iteration.

The learning control device 10 performs state control trials at regular intervals, that is, at every predetermined sampling cycle. A learning trial as a single learning control is completed by that the learning control device 10 repeats the state control trials at each sampling cycle. Therefore, a single learning trial includes a plurality of state control trials. One iteration of the above repetitive control corresponds to one learning trial.

The control target 50 is a target to be controlled by the learning control device 10. The control target 50 is a target of state control performed by the learning control device 10. The control target 50 includes, for example, a disk head driving device for a hard disk drive (HDD), semiconductor manufacturing equipment, and robots.

The state of the control target 50 is, for example, the position on the disk or the position of the robot. The state of the control target 50 is not limited to such a position. For example, the state of the control target 50 may be a position, velocity, and acceleration, and a combination of two or more of these. The state of the control target 50 preferably includes at least one of the position and velocity of the control target 50. The state of the control target 50 may include an external force applied to the control target 50. The external force applied to the control target 50 is, for example, a biasing force.

The learning control device 10 includes a learning control unit 20, a feedback control unit 24, a first addition unit 26, a tracking error calculation unit 28, a coefficient output unit 42, and the control target 50.

The control target 50 operates in response to input control signals that are sequentially received from the feedback control unit 24 through the first addition unit 26 for each state control trial. The control target 50 sequentially outputs an operation result state representing the state of a result of the operation. The operation result state of the control target 50 may be detected by a detector such as a known sensor installed outside the control target 50.

The tracking error calculation unit 28 calculates a tracking error. The tracking error represents the error for the target state with respect to the operation result state of the control target 50. In other words, the tracking error represents an error in the current state for the target state with respect to the control target 50. For example, the tracking error calculation unit 28 calculates an error between the operation result state of the control target 50 and the target state of the control target 50, and outputs the error to the learning control unit 20 and the feedback control unit 24. The tracking error calculation unit 28 sequentially receives the operation result state output from the control target 50 for each state control trial, calculates the error for the target state for each operation result state received, and outputs the error to the learning control unit 20 and the feedback control unit 24.

The feedback control unit 24 generates a feedback signal to cause the operation result state of the control target 50 to track the target state by using the tracking error received from the tracking error calculation unit 28, and outputs the feedback signal to the first addition unit 26. Details of the feedback control unit 24 will be described below.

The first addition unit 26 outputs, to the control target 50, an input control signal obtained by adding up the feedback signal received from the feedback control unit 24 and a multiplication result received from the learning control unit 20, the multiplication result obtained by multiplying the correction value by a coefficient k (correction value×coefficient k).

In this manner, the learning control device 10 is provided with a feedback communication path F. The feedback communication path F is a communication path by which, after an input control signal according to a feedback signal from the feedback control unit 24 is input to the control target 50, a tracking error according to an operation result state of the control target 50 in response to the input control signal is input to the feedback control unit 24. In one example illustrated in FIG. 1, the feedback communication path F is constituted by the tracking error calculation unit 28, the feedback control unit 24, the first addition unit 26, and the control target 50.

The learning control unit 20 has an update unit 30 and a correction unit 40.

The update unit 30 updates a correction value of a learning memory 32 in accordance with the tracking error.

The correction value is a correction value that is learned by the learning control unit 20 for each state control trial. The correction value is used for correcting a signal to be output to the control target 50. In other words, the correction value is a learned value that represents the amount of correction used in a learning trial.

Specifically, the update unit 30 updates the correction value in the learning memory 32 in accordance with the signal communicated through the feedback communication path F. The signal used by the update unit 30 for updating the correction value and communicated through the feedback communication path F may be, for example, a tracking error output from the tracking error calculation unit 28, a feedback signal output from the feedback control unit 24, an input control signal output from the first addition unit 26, or an operation result state output from the control target 50.

FIG. 1 illustrates, as one example, a mode that the update unit 30 updates the correction value to be used in the next learning trial in accordance with the tracking error observed in the current learning trial.

In the present embodiment, the terms "current" and "next" refer to one and the other of two consecutive learning trials in the time series.

In the present embodiment, the current learning trial means the time of the most recent learning trial, and the next learning trial means the time of the learning trial after the current one.

The update unit 30 includes the learning memory 32, a gain multiplication unit 34, a second addition unit 36, and a phase filter application unit 38. The learning memory 32 may be installed outside the update unit 30.

The learning control device 10 of the present embodiment includes the single learning memory 32.

The learning memory 32 is a memory serving to store the correction value for each sampling step i. For example, the learning memory 32 has a memory length L. The sampling step i represents a step of the state control trial by the learning control device 10 for each sampling cycle. The correction value for the sampling step i stored in the learning memory 32 is updated by the operation of the control target 50 up to the last learning trial.

The gain multiplication unit 34 multiplies the signal communicated through the feedback communication path F by the gain g. The gain multiplication unit 34 multiplies the tracking error observed in the current learning trial by the gain g in the example illustrated in FIG. 1. In the present embodiment, the gain multiplication unit 34 uses, as the tracking error, an error between the target state and the operation result state received from the tracking error calculation unit 28. The gain multiplication unit 34 is not limited to the mode of receiving the tracking error for the tracking error calculation unit 28. For example, the gain multiplication unit 34 may obtain a signal, such as the tracking error for another functional unit constituting the feedback communication path F and use the signal for multiplication of the gain g.

The phase filter application unit 38 uses a zero-phase filter Q and outputs, to the second addition unit 36, the correction value for the sampling step i stored in the learning memory 32, ahead by the number of predecessors d. The zero-phase filter Q is a filter to stabilize learning by preventing oscillations of the learning memory 32 in updating.

The second addition unit 36 stores, in the learning memory 32, as the correction value for the sampling step i, an addition result obtained by adding up the multiplication result obtained by multiplying the tracking error observed in the current learning trial by the gain g and the correction value for the sampling step i stored in the learning memory 32, which has been input from the phase filter application unit 38. Thus, the correction value for the sampling step i stored in the learning memory 32 is sequentially updated for each learning trial in accordance with the newly observed tracking error.

In learning control, in a case that the same single learning memory 32 is used, different learning trials share the same control target waveform, which represents the transition of an output signal representing the operation result state output from the control target 50. Thus, when different control target waveforms are to be output from the control target 50, conventional technologies are required to prepare a plurality of the learning memories 32 to perform learning control by using each of the learning memories 32.

Figure 2:
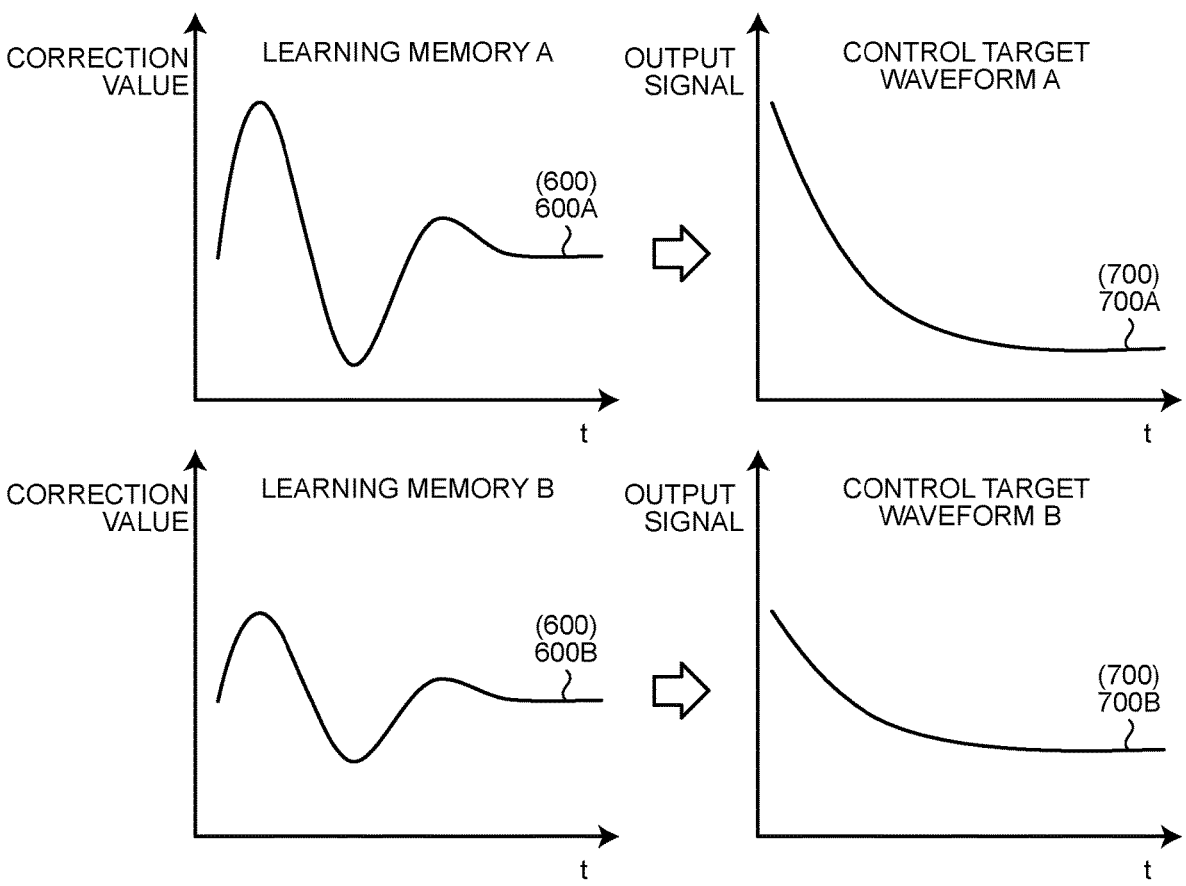
FIG. 2 is an explanatory diagram of conventional learning control.

FIG. 2 is an explanatory diagram of an example of conventional learning control.

In the conventional technologies, learning control performance have deteriorated when an attempt is made to configure a plurality of types of control target waveforms 700 with different waveforms to be capable of being output from the control target 50 by using correction values stored in the single learning memory 32. Thus, as illustrated in FIG. 2, in order to configure a plurality of types of the control target waveforms 700 (control target waveform 700A, control target waveform 700B) with different waveforms to be capable of being output from the control target 50, the conventional technologies have needed a configuration including the learning memories 32 for each type of the control target waveform 700 to perform a learning trial for each of the learning memories 32. The learning memories 32 have different learning control waveforms 600 from each other, the learning control waveforms 600 being represented by the transition of correction values read from the learning memories 32. In other words, the conventional technologies have needed a learning memory A and a learning memory B prepared, the learning memory A storing correction values represented by a learning control waveform 600A to enable output of a control target waveform A from the control target 50, the learning memory B storing correction values represented by a learning control waveform 600B to enable output of a control target waveform B from the control target 50.

In this manner, the conventional technologies need a plurality of the learning memories 32 prepared for a plurality of types of the control target waveforms 700, which may increase the number of the learning memories 32 needed and increase the number of learning trials by learning control using each of the learning memories 32.

Returning to FIG. 1, the description is continued. The learning control device 10 of the present embodiment includes the coefficient output unit 42, the feedback control unit 24, and the correction unit 40.

The coefficient output unit 42 outputs the coefficient k. The coefficient k may be any value larger than or equal to 1, or smaller than 1. The coefficient output unit 42 outputs the same value of the coefficient k to the correction unit 40 and the feedback control unit 24.

As described above, the feedback control unit 24 generates, by using the tracking error, a feedback signal used for causing the operation result state of the control target 50 to track the target state. The feedback control unit 24 then outputs the feedback signal to the first addition unit 26. In the present embodiment, the feedback control unit 24 generates and outputs the feedback signal on the basis of the tracking error, such that the control target waveform represented by transition of the output signal representing the operation result state output from the control target 50 in a learning trial period becomes a waveform obtained by calculating the coefficient k on the whole of a base control target waveform determined in advance. Multiplication, division, etc. may be applied to the calculation of the coefficient k on the whole of the base control target waveform. In the present embodiment, the feedback control unit 24 generates and outputs the feedback signal on the basis of the tracking error such that the control target waveform becomes a waveform obtained by multiplying the whole of the base control target waveform by the coefficient k.

Figure 3:
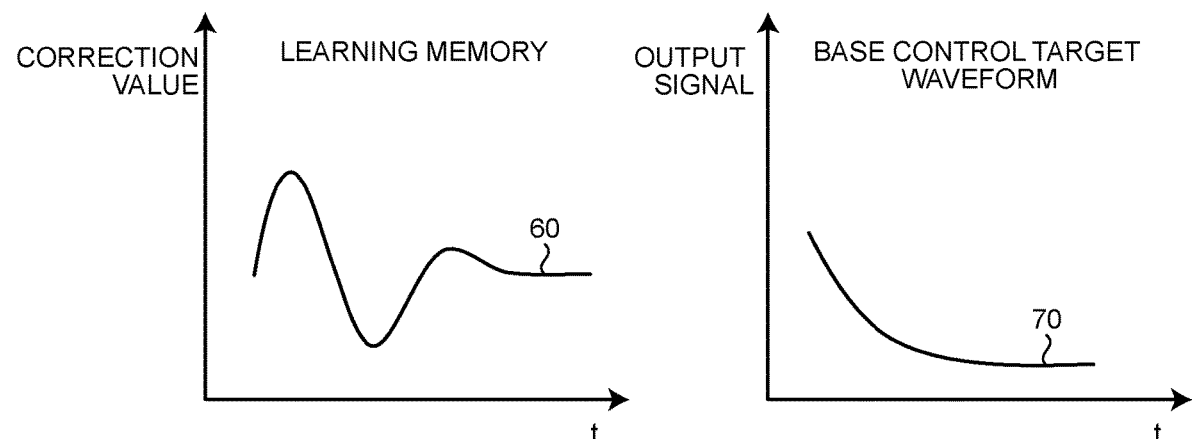
FIG. 3 is an explanatory diagram of a base control target waveform.

FIG. 3 is an explanatory diagram of an example of a base control target waveform 70.

The base control target waveform 70 represents transition of the output signal representing the operation result state output from the control target 50 when the control target 50 is controlled in accordance with a base learning control waveform 60 represented by the transition of correction values read from the learning memory 32 in the learning trial period. Controlling the control target 50 in accordance with the base learning control waveform 60 means controlling the control target 50 by using a correction value represented by the base learning control waveform 60 without correcting the correction value with the coefficient k. Not correcting the correction value with the coefficient k means a mode of not using the coefficient k or a mode of using the coefficient k having a value by which the correction value is not changed before and after the multiplication. The value of the coefficient k in the latter case is "1". Input control signals represented by the base learning control waveform 60 are input control signals for the states of all elements of the control target 50. The states of all elements means all elements that represent states, for example, position, velocity, and biasing force, rather than position alone that represents a state.

Figure 4A:
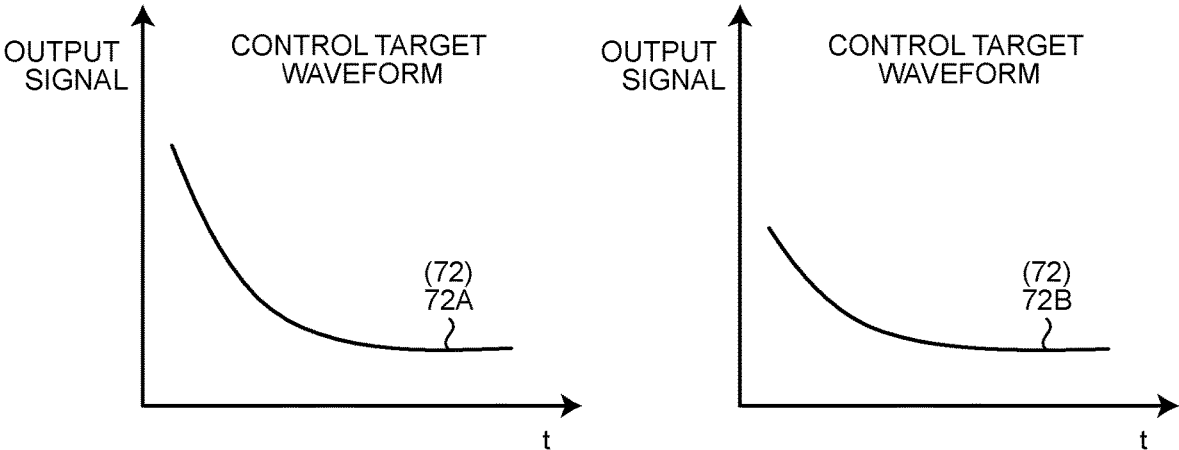
FIG. 4A is an explanatory diagram of control target waveforms.

FIG. 4A is an explanatory diagram of an example of a control target waveform 72 generated by the feedback control unit 24. The feedback control unit 24 generates and outputs a feedback signal such that the control target waveform 72 represented by the transition of the output signal representing the operation result state output from the control target 50 in the learning trial period becomes a waveform obtained by multiplying the whole of the base control target waveform 70 by the coefficient k.

For example, assume that the coefficient k is a specific numerical value. In this case, the feedback control unit 24 generates and outputs a feedback signal such that an input control signal represented by a control target waveform 72A (see FIG. 4A), which is obtained by multiplying the whole of the base control target waveform 70 illustrated in FIG. 3 by the coefficient k, is input to the control target 50.

Assume also that the coefficient k is a numerical value different from the specific numerical value described above. In this case, the feedback control unit 24 generates and outputs a feedback signal such that an input control signal represented by a control target waveform 72B (see FIG. 4A), which is obtained by multiplying the whole of the base control target waveform 70 illustrated in FIG. 3 by the coefficient k, is input to the control target 50.

The control target waveform 72A and the control target waveform 72B are examples of the control target waveform 72, and are obtained by multiplying the whole of the base control target waveform 70 by the respective coefficients k that differ from each other.

Returning to FIG. 1, the description is continued.

The correction unit 40 outputs, to the feedback communication path F, a calculation result (correction value× coefficient k) obtained by calculating the coefficient k on the correction value stored in the learning memory 32. Multiplication, division, or the like may be used for the calculation of the coefficient k on the correction value. In the present embodiment, a multiplication result (correction value×coefficient k) obtained by multiplying the correction value stored in the learning memory 32 by the coefficient k is output to the feedback communication path F as a calculation result. In other words, the correction unit 40 receives, from the coefficient output unit 42, the coefficient k of the same value as the coefficient k output by the coefficient output unit 42 to the feedback control unit 24. The correction unit 40 then outputs, to the feedback communication path F, a multiplication result (correction value×coefficient k) obtained by multiplying the correction value for the updated sampling step i in the learning memory 32 by the coefficient k received from the coefficient output unit 42. In the present embodiment, the correction unit 40 outputs the multiplication result (correction value×coefficient k) to the first addition unit 26 in the feedback communication path F.

The first addition unit 26 outputs, to the control target 50, an input control signal obtained by adding up the feedback signal received from the feedback control unit 24 and the multiplication result received from the learning control unit 20, the multiplication result obtained by multiplying the correction value by the coefficient k. If the correction unit 40 outputs the multiplication result to a path other than between the feedback control unit 24 and the control target 50 in the feedback communication path F, an addition unit may be provided at the location where the output is produced in the feedback communication path F, the signal flowing in the feedback communication path F and the multiplication result may be added up, and the result may be output to the next functional unit along the communication direction of the signal communicated through the feedback communication path F.

Figure 4B:
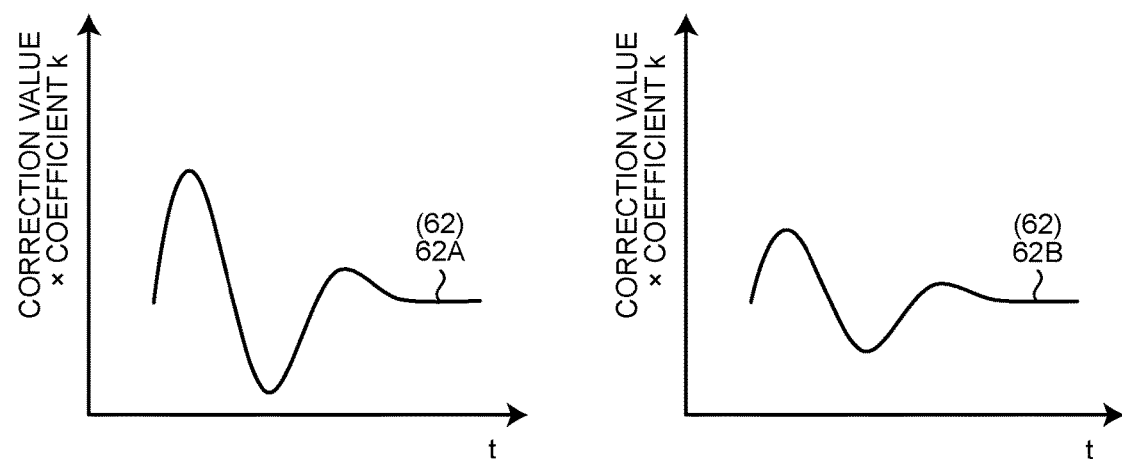
FIG. 4B is an explanatory diagram of learning control waveforms.

FIG. 4B is an explanatory diagram of an example of a learning control waveform 62 that represents the transition of the multiplication result (correction value×coefficient k) output by the correction unit 40. The learning control waveform 62 represents the transition of the multiplication result (correction value×coefficient k) output from the learning control unit 20 to the feedback communication path F in the learning trial period. The correction unit 40 outputs, to the feedback communication path F, the multiplication result (correction value×coefficient k) obtained by multiplying the correction value stored in the learning memory 32 by the coefficient k. As a result, the learning control waveform 62 becomes a waveform obtained by multiplying the whole of the base learning control waveform 60 (see FIG. 3) by the coefficient k.

For example, assume that the coefficient k is a specific numerical value. In this case, for example, the correction unit 40 outputs, to the feedback communication path F, a multiplication result (correction value×coefficient k) represented by a learning control waveform 62A (FIG. 4B), which is obtained by multiplying the whole of the base learning control waveform 60 illustrated in FIG. 3 by the coefficient k.

Assume also that the coefficient k is a numerical value different from the specific numerical value described above. In this case, for example, the correction unit 40 outputs, to the feedback communication path F, a multiplication result (correction value×coefficient k) represented by a learning control waveform 62B (FIG. 4B), which is obtained by multiplying the whole of the base learning control waveform 60 illustrated in FIG. 3 by the coefficient k.

The learning control waveform 62A and the learning control waveform 62B are examples of the learning control waveform 62, and are obtained by multiplying the whole of the base learning control waveform 60 by the respective coefficients k that differ from each other. The coefficient k used in the correction unit 40 and the coefficient k used in the feedback control unit 24 are of the same value.

Thus, the learning control waveform 62 representing the multiplication result (correction value×coefficient k) output from the correction unit 40 and the control target waveform 72 representing the transition of the output signal representing the operation result state output from the control target 50 in response to the feedback signal output from the feedback control unit 24 are waveforms that maintain the relation between the base learning control waveform 60 and the base control target waveform 70.

Consequently, the learning control device 10 can use the single learning memory 32 to perform learning control such that output signals representing the operation result states represented by a plurality of types of the control target waveforms 72 can be output from the control target 50.

The base control target waveform 70 represents the transition of the output signal representing the operation result state output from the control target 50 in a case where the control target 50 is controlled without correcting the correction values with the coefficient k (that is, the coefficient k is always fixed at "1") in accordance with the base learning control waveform 60 represented by the transition of the correction values read from the learning memory 32 in the learning trial period, as described above.

Since the control target 50 of the present embodiment includes the correction unit 40 and the feedback control unit 24, each performing processing using the same coefficient k, it is possible to prevent learning control performance from deteriorating in the learning control device 10 including the single learning memory 32.

As described above, the learning control device 10 of the present embodiment includes the learning memory 32, the feedback control unit 24, the correction unit 40, and the update unit 30. The learning memory 32 stores correction values to be used in learning trials. The feedback control unit 24 generates and outputs a feedback signal on the basis of a tracking error for the target state of the control target 50. The control target 50 operates in response to an input control signal and outputs an operation result state during the learning trial. The feedback signal is used for causing the operation result state of the control target 50 to track the target state. The feedback signal is generated by the feedback control unit 24 such that the control target waveform 72 represented by transition of the output signal of the operation result state output from the control target 50 becomes a waveform obtained by calculating the coefficient k on the whole of the predetermined base control target waveform 70. The correction unit 40 outputs a calculation result obtained by calculating the coefficient k on the correction value, to the feedback communication path F by which the tracking error according to the operation result state of the control target 50 is input to the feedback control unit 24. The update unit 30 updates the correction value stored in the learning memory 32 in accordance with the signal communicated through the feedback communication path F.

In this manner, feedback control unit 24 generates and outputs a feedback signal on the basis of a tracking error for the target state of the control target 50. The control target 50 operates in response to an input control signal and outputs an operation result state during the learning trial. The feedback signal is used for causing the operation result state of the control target 50 to track the target state. The feedback signal is generated by the feedback control unit 24 such that the control target waveform 72 represented by transition of the output signal of the operation result state output from the control target 50 becomes a waveform obtained by calculating the coefficient k on the whole of the predetermined base control target waveform 70. The correction unit 40 outputs, to the feedback communication path F, a calculation result obtained by calculating using the same value of the coefficient k as that used by the feedback control unit 24 for the correction value stored in the learning memory 32.

Consequently, the learning control device 10 is capable of performing learning control by using the single learning memory 32 such that output signals representing the operation result states represented by multiple types of the control target waveforms 72 can be output from the control target 50.

In other words, not using two or more learning memories but instead using the single learning memory 32, the learning control device 10 of the present embodiment is able to perform learning control such that output signals representing the operation result states represented by multiple types of the control target waveforms 72 can be output from the control target 50.

Therefore, the learning control device 10 of the present embodiment can prevent increases in the number of the learning memories 32 and the number of learning trials.

First Example

An example of the learning control device 10 of the present embodiment will be described next.

Figure 5:
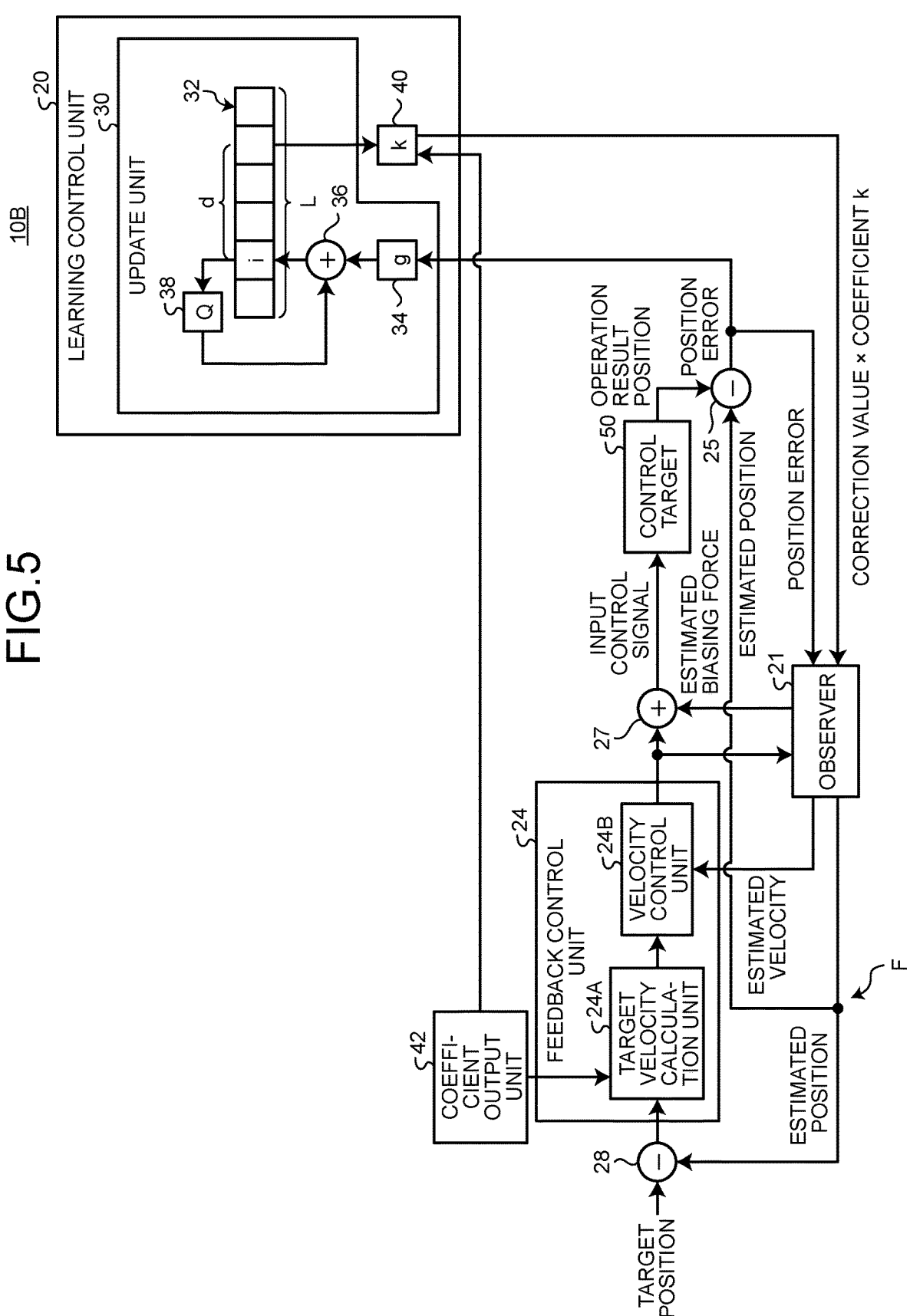
FIG. 5 is a schematic diagram of a learning control device.

FIG. 5 is a schematic diagram of an example of a learning control device 10B according to the present example. The learning control device 10B is an example of the learning control device 10.

In the present example, a mode is described as an example in which the target position of the control target 50 is used as the target state of the control target 50, and the operation result position of the control target 50 is used as the operation result state of the control target 50. In the present example, a mode is also described as an example in which the position, velocity, and biasing force are used as the state of the control target 50. In the present example, a mode is assumed for description in which the control target 50 is a disk head driving device for HDDs. Thus, a mode is described as an example in which the learning control device 10B of the present example performs positioning control of the disk head driving device for HDDs.

The learning control device 10B includes the learning control unit 20, the feedback control unit 24, the first addition unit 27, the tracking error calculation unit 28, the control target 50, an observer 21, and a tracking error calculation unit 25.

The control target 50 in the present example operates in response to input control signals that are sequentially received from the feedback control unit 24 through the first addition unit 27 for each state control trial. The control target 50 then sequentially outputs an operation result position representing the operation result state being the position of a result of the operation.

The tracking error calculation unit 25 calculates a position error between the operation result position output from the control target 50 and an estimated position of the control target 50 output from the observer 21. The tracking error calculation unit 25 outputs the calculated position error to the gain multiplication unit 34 of the learning control unit 20 and the observer 21.

The gain multiplication unit 34 of the learning control unit 20 is similar to the learning control device 10 of the above embodiment, except that the position error output from the tracking error calculation unit 25 is used instead of the tracking error output from the tracking error calculation unit 28. The correction unit 40 of the learning control unit 20 is similar to the learning control device 10 of the above embodiment, except that the multiplication result (correction value×coefficient k) is output to the observer 21 instead of the first addition unit 26.

The observer 21 estimates the state of the control target 50. In the present example, the observer 21 estimates an estimated position being an estimation result of the position of the control target 50, an estimated velocity being an estimation result of the velocity of the control target 50, and an estimated biasing force being an estimation result of the biasing force of the control target 50.

The observer 21 calculates the estimated position and estimated velocity of the control target 50 by using, for example, the feedback signal input from the feedback control unit 24 and the position error input from the tracking error calculation unit 25, by a known method. The observer 21 then outputs the estimated position to the tracking error calculation unit 28 and the estimated velocity to the feedback control unit 24.

The observer 21 calculates the estimated biasing force being an estimation result of the biasing force of the control target 50, by using the position error input from the tracking error calculation unit 25 and the multiplication result (correction value×coefficient k) input from the correction unit 40. Specifically, the observer 21 calculates, as the estimated biasing force of the control target 50, an integral value of the position error input from the tracking error calculation unit 25 multiplied by a gain coefficient Lb and the above multiplication result (correction value×coefficient k). The observer 21 then outputs the calculated estimated biasing force to the first addition unit 27.

The observer 21 may calculate at least one of the estimated position, estimated velocity, and estimated biasing force, by using the multiplication result (correction value× coefficient k), and is not limited to the mode that the multiplication result (correction value×coefficient k) is used only for calculating the estimated biasing force.

The tracking error calculation unit 28 calculates a tracking error. In the present example, the tracking error calculation unit 28 calculates a position error between the estimated position input from the observer 21 and the target position as the tracking error, and outputs the position error to the feedback control unit 24.

The feedback control unit 24 generates a feedback signal to cause the operation result state of the control target 50 to track the target state, by using the tracking error received from the tracking error calculation unit 28, and outputs the feedback signal to the first addition unit 27. As described above, the feedback control unit 24 generates and outputs a feedback signal to cause the operation result state of the control target 50 to track the target state on the basis of the tracking error for the target state of the control target 50 such that the control target waveform 72 represented by the transition of the output signal representing the operation result state output from the control target 50 in the learning trial period becomes a waveform obtained by multiplying the whole of the predetermined base control target waveform 70 by the coefficient k.

In the present example, the feedback control unit 24 includes a target velocity calculation unit 24A and a velocity control unit 24B.

Figure 6:
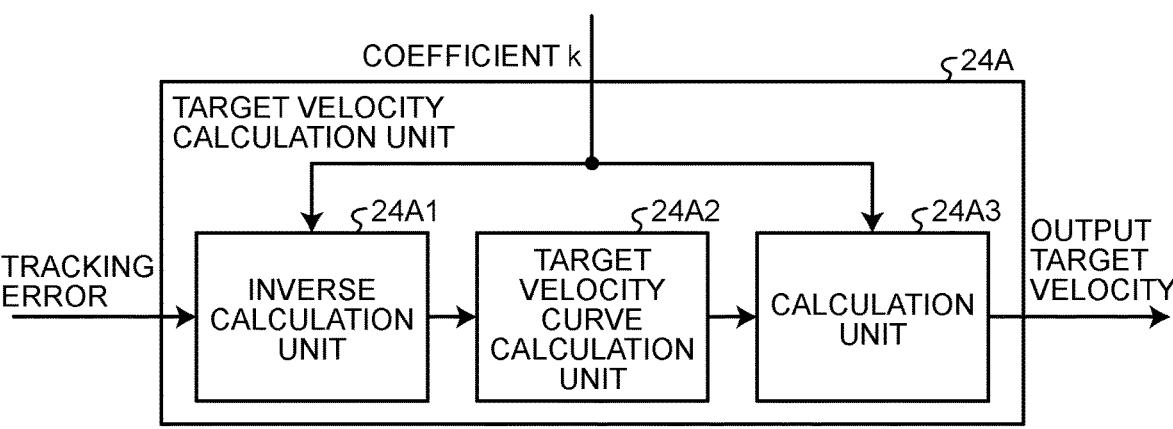
FIG. 6 is a schematic diagram of a target velocity calculation unit.

FIG. 6 is a schematic diagram of an example of the target velocity calculation unit 24A according to the present example. The target velocity calculation unit 24A includes an inverse calculation unit 24A1, a target velocity curve calculation unit 24A2, and a calculation unit 24A3.

The inverse calculation unit 24A1 outputs, to the target velocity curve calculation unit 24A2, a tracking error inverse calculation result obtained by calculating the inverse (1/k) of the coefficient k on the tracking error for the target position. In the present embodiment, the inverse calculation unit 24A1 outputs, to the target velocity curve calculation unit 24A2, a tracking error inverse multiplication result obtained by multiplying the tracking error for the target position by the inverse (1/k) of the coefficient k.

The target velocity curve calculation unit 24A2 outputs, to the calculation unit 24A3, a first target velocity corresponding to the tracking error that matches the tracking error inverse calculation result in a base target velocity curve representing the base control target waveform 70 by a relation between the tracking error and the target velocity.

The calculation unit 24A3 outputs, to the first addition unit 27, a calculation result obtained by calculating the coefficient k on the first target velocity calculated in the target velocity curve calculation unit 24A2, as an output target velocity. In the present embodiment, the calculation unit 24A3 outputs, to the first addition unit 27, a multiplication result obtained by multiplying the first target velocity calculated in the target velocity curve calculation unit 24A2 by the coefficient k.

Figure 7:
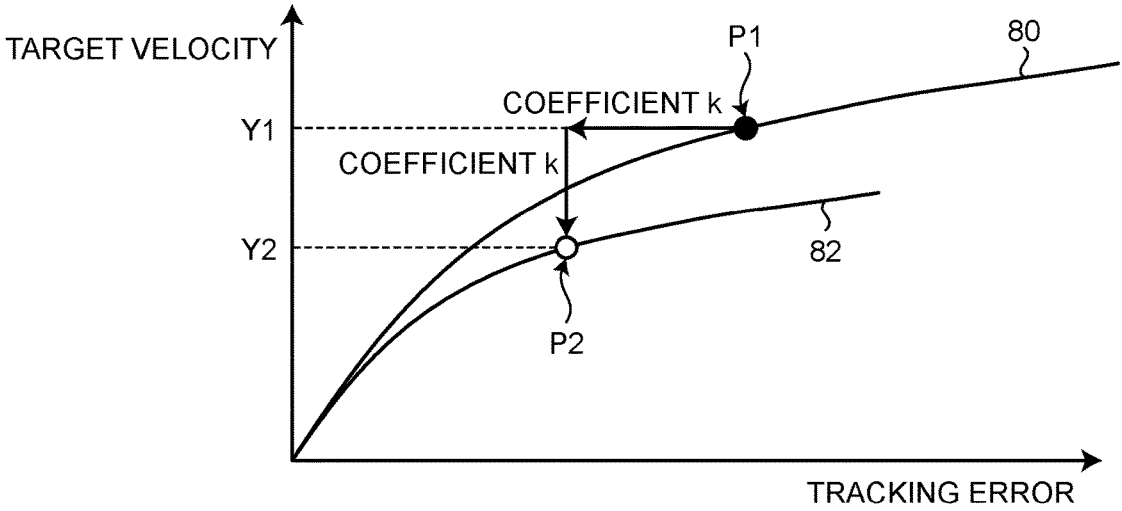
FIG. 7 is an explanatory diagram of processing by the target velocity calculation unit.

FIG. 7 is an explanatory diagram of an example of processing by the target velocity calculation unit 24A. In FIG. 7, the vertical axis represents the target velocity and the horizontal axis represents the tracking error. A line diagram 80 represents the base target velocity curve. A line diagram 82 represents the target velocity curve to be calculated.

The base target velocity curve represented by the line diagram 80 represents the base control target waveform 70 by a relation between the tracking error and the target velocity, as described above. In other words, the base target velocity curve represented by the line diagram 80 is a waveform of the control target 50 when the coefficient k is "1".

The target velocity curve to be calculated, which is represented by the line diagram 82, is a curve obtained by multiplying the base target velocity curve of the line diagram 80 by the coefficient k in both the target velocity and tracking error directions, where the coefficient k is a value other than "1".

For example, assume that a plot P1 is a plot on the base target velocity curve corresponding to the tracking error inverse calculation result obtained by multiplying the tracking error for the target position by the inverse (1/k) of the coefficient k. In this case, the target velocity curve calculation unit 24A2 outputs a first target velocity Y1 of the plot P1 to the calculation unit 24A3. The calculation unit 24A3 outputs, to the velocity control unit 24B, a target velocity Y2 corresponding to a plot P2 on the target velocity curve to be calculated, represented by the line diagram 82, the target velocity curve being a multiplication result obtained by multiplying the first target velocity Y1 by the coefficient k, as the output target velocity.

In this manner, the feedback control unit 24 includes the target velocity calculation unit 24A having the inverse calculation unit 24A1, the target velocity curve calculation unit 24A2, and the calculation unit 24A3, and the velocity control unit 24B in the present example, thereby generating and outputting a feedback signal such that the control target waveform 72 represented by transition of the output signal representing the operation result state output from the control target 50 in the learning trial period becomes a waveform obtained by multiplying the whole of the predetermined base control target waveform 70 by the coefficient k.

Returning to FIG. 5, the description is continued.

The velocity control unit 24B generates an input control signal relative to the velocity of the control target 50 by using the output target velocity input from the target velocity calculation unit 24A and the estimated velocity input from an observer 21. The velocity control unit 24B then outputs the input control signal as a feedback signal to the first addition unit 27. The input control signal relative to the velocity of the control target 50 is, specifically, a velocity control input signal to control the velocity of the control target 50.

The first addition unit 27 outputs, to the control target 50, an addition result obtained by adding up the velocity control input signal input from the velocity control unit 24B and the estimated biasing force input from the observer 21, as the input control signal. The control target 50 operates in response to the input control signal that has been input, and outputs the operation result position.

In this manner, the feedback control unit 24 is configured to include the target velocity calculation unit 24A including the inverse calculation unit 24A1, the target velocity curve calculation unit 24A2, and the calculation unit 24A3, and the velocity control unit 24B in the present example. With this configuration, a feedback signal is generated and output such that the control target waveform 72 represented by the transition of the output signal representing the operation result state output from the control target 50 in the learning trial period becomes a waveform obtained by multiplying the whole of the predetermined base control target waveform 70 by the coefficient k. The correction unit 40 outputs the multiplication result (correction value×coefficient k) obtained by multiplying the correction value by the coefficient k to the feedback communication path F by which the tracking error according to the operation result state of the control target 50 is input to the feedback control unit 24. The coefficient k used by the feedback control unit 24 and the coefficient k used by the correction unit 40 are of the same value.

Consequently, similarly to the learning control device 10 of the above embodiment, the learning control device 10B of the present example is capable of perform learning control with the single learning memory 32 such that output signals representing the operation result states represented by multiple types of the control target waveforms 72 can be output from the control target 50. Therefore, the learning control device 10B of the present example can prevent increases in the number of the learning memories 32 and the number of learning trials. The learning control device 10B of the present example can also prevent learning control performance from deteriorating even when the learning control device 10B is configured with the single learning memory 32.

In the conventional technologies, the feedback control unit (24) does not include the inverse calculation unit 24A1, and the learning control device (10) does not include the correction unit 40. In the conventional technologies, even when the correction unit 40 has been installed, the coefficient k=1, which is a coefficient that does not contribute to correction, is always used for processing. Consequently, in the conventional technologies, the control target waveform 72 represented by the transition of the output signal representing the operation result state output from the control target 50 in the learning trial period does not become the waveform obtained by multiplying the whole of the predetermined base control target waveform 70 by the coefficient k, but rather a deformed version of the control target waveform 72. Thus, the conventional technologies have degraded learning control performance. In the conventional technologies, two or more the learning memories 32 are used for improving improve learning control performance, resulting in increases in the number of the learning memories 32 and the number of learning trials due to a learning trial for each of the learning memories 32.

In contrast, the learning control device 10B of the present example is capable of performing learning control with the single learning memory 32 such that output signals representing the operation result states represented by multiple types of the control target waveforms 72 can be output from the control target 50. Consequently, the learning control device 10B of the present example can prevent increases in the number of the learning memories 32 and the number of learning trials. The learning control device 10B of the present example can also prevent learning control performance from deteriorating even when the learning control device 10B is configured with the single learning memory 32.

First Modification

In the above-described first example, the observer 21 is configured to calculate the estimated biasing force. Alternatively, a functional unit that calculates the estimated biasing force may be configured as a separate unit from the observer 21.

Figure 8:
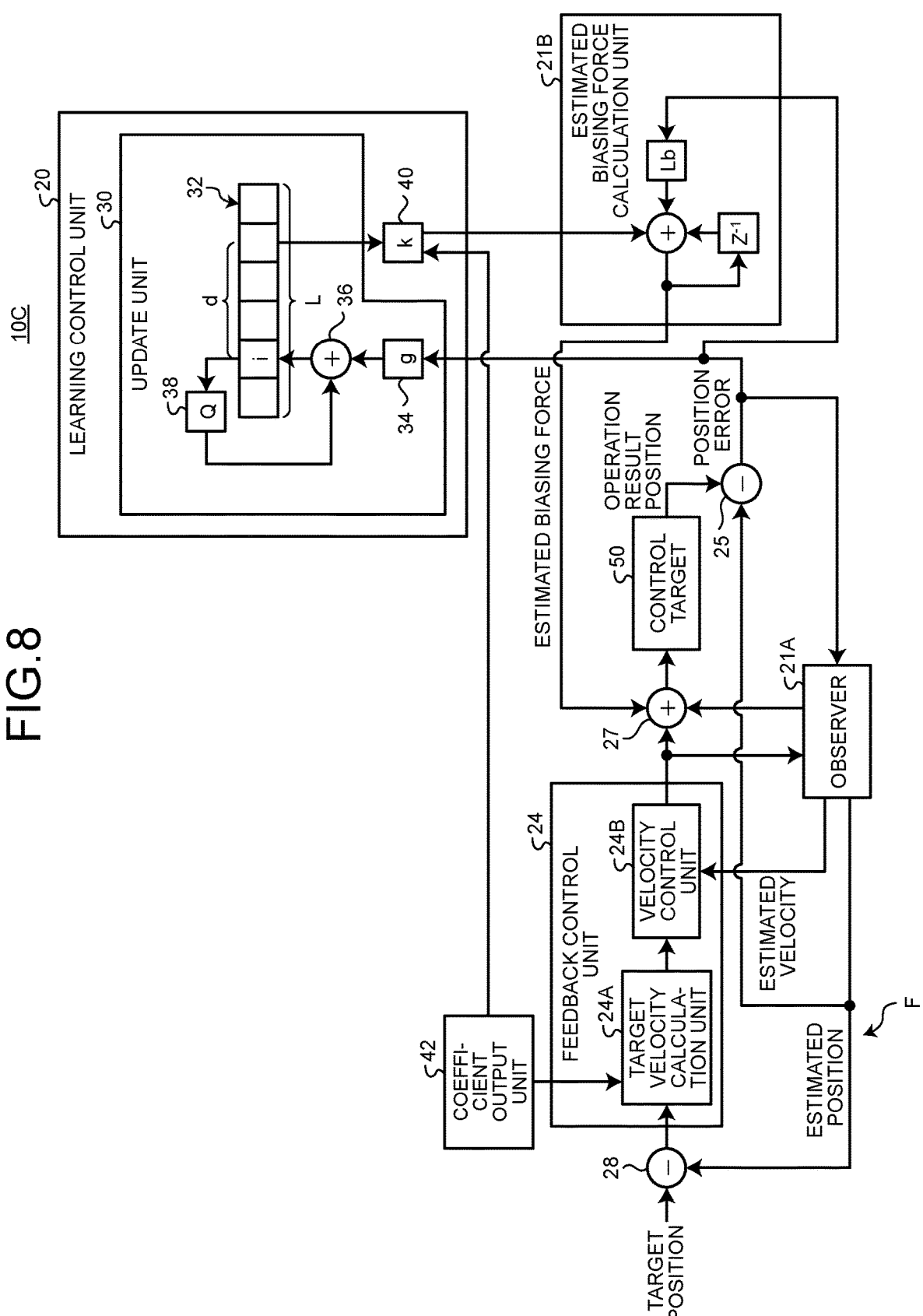
FIG. 8 is a schematic diagram of a learning control device.

FIG. 8 is a schematic diagram of an example of a learning control device 10C according to the first modification. The learning control device 10C is a modification example of the learning control device 10.

The learning control device 10C of the present example is similar to the learning control device 10B of the above example, except that the learning control device 10C includes an observer 21A and an estimated biasing force calculation unit 21B in place of the observer 21 of FIG. 5. When there is no delay in the model of the control target 50 and the feedback gain of the biasing force is "–1" in the learning control device 10B (FIG. 5), such learning control device 10B can be modified into the learning control device 10C (FIG. 8).

The observer 21A estimates an estimated position being a result obtained by estimating the position of the control target 50, and an estimated velocity being a result obtained by estimating the velocity of the control target 50. The observer 21A may estimate the estimated position and the estimated velocity in the same manner as the observer 21 of FIG. 5.

The estimated biasing force calculation unit 21B estimates an estimated biasing force being a result obtained by estimating the biasing force of the control target 50. The estimated biasing force calculation unit 21B calculates the estimated biasing force being a result obtained by estimating the biasing force of the control target 50, by using the position error input from the tracking error calculation unit 25 and the multiplication result (correction value×coefficient k) input from the correction unit 40. Specifically, the observer 21A calculates an integral value of the position error input from the tracking error calculation unit 25 multiplied by the gain coefficient Lb and the above multiplication result (correction value×coefficient k) as the estimated biasing force of the control target 50. The observer 21A then outputs the calculated estimated biasing force to the first addition unit 27.

In this manner, the estimated biasing force calculation unit 21B, which is a functional unit that calculates the estimated biasing force included in the learning control device 10B of the above-described first example (FIG. 5), may be configured as a separate unit from the observer 21A.

Effects

FIGS. 9A through 10B are explanatory diagrams of effects of the learning control device 10 according to the present embodiment.

In FIGS. 9A through 10B, the vertical axis represents the difference between the target position and the actual position of the control target 50. The horizontal axis represents the number of samples after the difference between the target position and the actual position of the control target 50 becomes constant. FIGS. 9A through 10B illustrate the difference between the target position and the actual position when the control target 50 is operated with different values of the coefficient k, after sufficient learning control using the same control target waveform 72 and the learning control waveform 62 without changing the value of the coefficient k, and with the learning memory 32 fixed without updating. The waveforms of the control target waveform 72 and the learning control waveform 62 with change in value of the coefficient k, whereas only the single learning memory 32 was used.

Figure 9A:
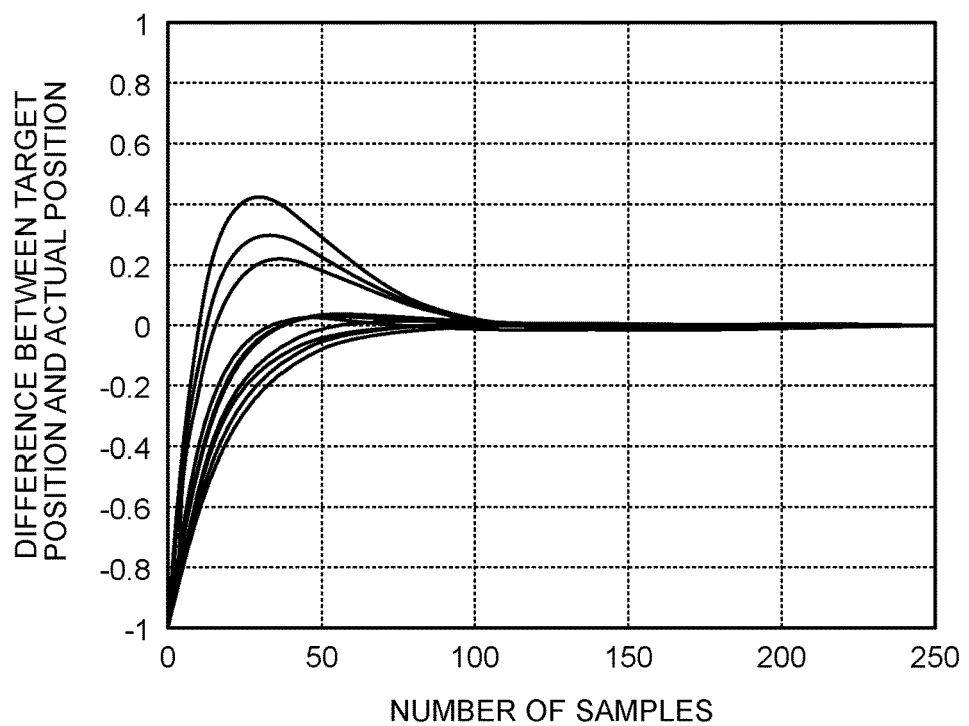
FIG. 9A is an explanatory diagram of an effect of the learning control device.
Figure 9B:
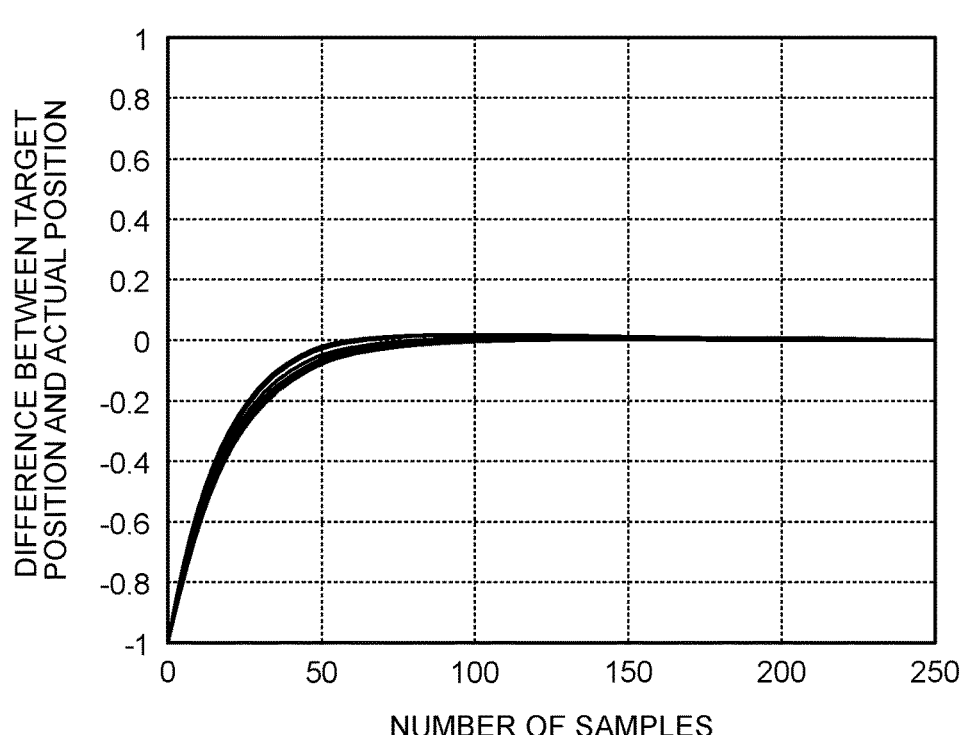
FIG. 9B is an explanatory diagram of an effect of the learning control device.

FIGS. 9A and 9B are diagrams illustrating simulation results.

FIG. 9A is a diagram illustrating a simulation result for a case in which a comparative learning device was used. FIG. 9B is a diagram illustrating a simulation result for a case in which the learning control device 10B according to the present embodiment was used. FIGS. 9A and 9B illustrate the simulation results obtained when the control target 50 is operated with the value of the learning memory 32 fixed and the coefficient k changed, after sufficient learning with a fixed coefficient k. The results for different coefficients k are overlaid.

The simulation result of the learning control device 10B of the above-described first example was used for the simulation result of the learning control device of the present embodiment in the illustration of FIG. 9B. The simulation result of the learning control device with the same configuration as the learning control device 10B in the above first example was used for the simulation result of a conventional comparative learning control device, which is the conventional learning control device in the illustration of FIG. 9A, except that the correction unit 40 is not included, the coefficient k used in the feedback control unit 24 is "1," and the feedback control unit 24 generates the feedback signal to cause the state of the control target 50 to track the target state without considering maintaining the shape of the waveform of the base control target waveform 70. Specifically, the simulation result of the learning control device with a configuration that does not include the correction unit 40, the coefficient output unit 42, or the inverse calculation unit 24A1 in the learning control device 10B in the above first example was used for the simulation result of the comparative learning control device.

In FIG. 9A, which is the simulation result of the conventional comparative learning device, variation of the entire waveforms can be seen. On the other hand, in FIG. 9B, which is the simulation result of the learning control device 10B of the present embodiment, it was confirmed that the variation and overshoot are prevented, and that the learning control performance is prevented from deteriorating.

FIGS. 10A and 10B are diagrams illustrating experimental results with actual devices.

FIG. 10A illustrates an experimental result for a case in which the above comparative learning device was used. FIG. 10B illustrates an experimental result for a case in which the learning control device 10B according to the present embodiment was used. FIGS. 10A and 10B illustrate the experimental results with the actual devices when the control target 50 is operated with the value of the learning memory 32 fixed and the coefficient k changed, after sufficient learning with a fixed coefficient k, and the results for different coefficients k are overlaid.

In FIG. 10A, which is the experimental result of the conventional comparative learning device, variation in the entire waveforms can be seen. On the other hand, in FIG. 10B, which is the experimental result of the learning control device 10B of the present embodiment, it was confirmed that the variation and overshoot are prevented, and that the control performance is prevented from deteriorating.

An example of a hardware configuration of the learning control device 10, the learning control device 10B, and the learning control device 10C according to the present embodiment will be described next.

Figure 11:
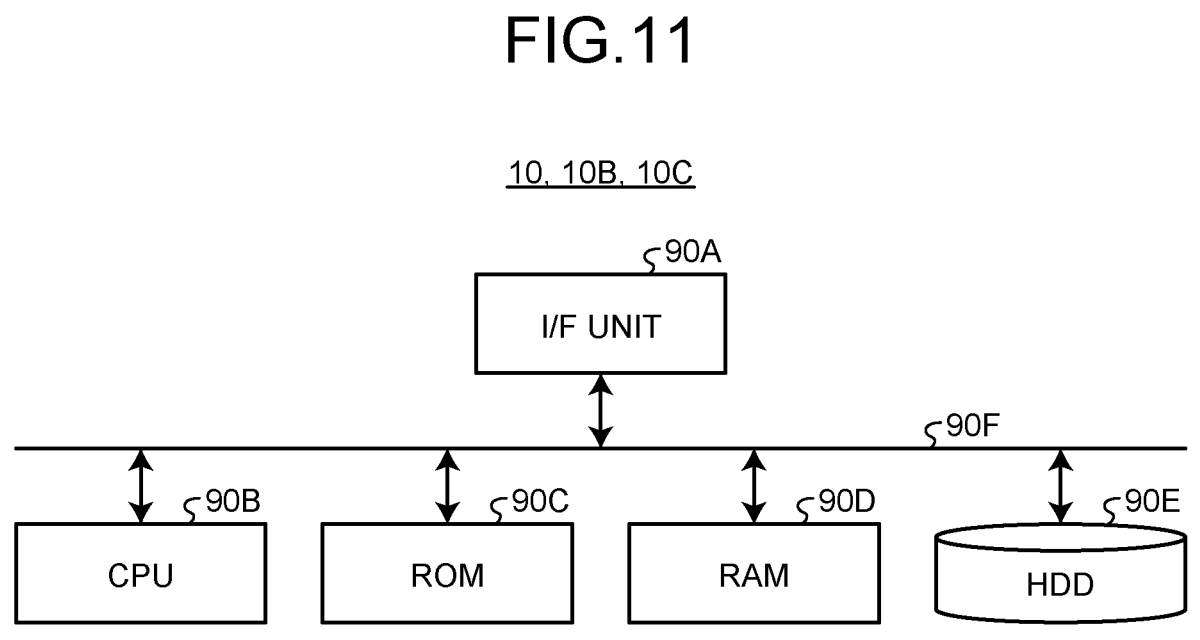

FIG. 11 is a hardware configuration diagram of the example of the learning control device 10, the learning control device 10B, and the learning control device 10C according to the present embodiment.

The learning control device 10, the learning control device 10B, and the learning control device 10C of the present embodiment includes a control unit such as a central processing unit (CPU) 90B, a memory device such as read-only memory (ROM) 90C, random-access memory (RAM) 90D, and a hard disk drive (HDD) 90E, an I/F unit 90A that interfaces with various devices, and a bus 90F that connects the units, and has a hardware configuration that uses an ordinary computer.

In the learning control device 10, the learning control device 10B, and the learning control device 10C of the present embodiment, the CPU 90B reads and executes a computer program from the ROM 90C onto the RAM 90D, thereby implementing each of the above units on the computer.

The computer program for executing the above processes performed by the learning control device 10, the learning control device 10B, and the learning control device 10C of the present embodiment may be stored in the HDD 90E. The computer program for executing the above processes performed by the learning control device 10, the learning control device 10B, and the learning control device 10C of the present embodiment may be pre-embedded in the ROM 90C and provided.

The computer program for executing the above processes performed by the learning control device 10, the learning control device 10B, and the learning control device 10C of the present embodiment may be stored in a computer-readable storage medium, such as a CD-ROM, CD-R, memory card, digital versatile disc (DVD), or flexible disk (FD), in an installable or executable format file, and provided as a computer program product. The computer program for executing the above processes performed by the learning control device 10, the learning control device 10B, and the learning control device 10C of the present embodiment may be stored on a computer connected to a network such as the Internet, and provided by having the computer program downloaded via the network. The computer program for executing the above processes performed by the learning control device 10, the learning control device 10B, and the learning control device 10C of the present embodiment may be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A learning control device comprising:
a learning memory configured to store a correction value to be used in a learning trial;
a hardware processor connected to the learning memory, the hardware processor being configured to:
output a coefficient;
generate a feedback signal on the basis of a tracking error for a target state of a control target and output the feedback signal, the control target operating in response to an input control signal and outputting an operation result state during the learning trial, the feedback signal being used for causing the operation result state of the control target to track the target state, the feedback signal being generated such that a control target waveform represented by transition of an output signal representing the operation result state becomes a waveform obtained by calculating the coefficient on the whole of a base control target waveform determined in advance;
output a calculation result obtained by calculating the coefficient on the correction value, to a feedback communication path by which the tracking error according to the operation result state of the control target is input; and
update the correction value stored in the learning memory in accordance with a signal communicated through the feedback communication path.

2. The learning control device according to claim 1, wherein the base control target waveform is the control target waveform obtained when the control target is controlled in accordance with a base learning control waveform represented by transition of the correction value read from the learning memory in the learning trial.

3. The learning control device according to claim 2, wherein
the operation result state is represented by a position,
the target state is represented by a target position, and
the hardware processor is configured to:
output a tracking error inverse calculation result obtained by calculating an inverse of the coefficient on the tracking error for the target position;
output a first target velocity corresponding to the tracking error matching the tracking error inverse calculation result in a base target velocity curve, the base target velocity curve representing the base control target waveform by a relation between the tracking error and the target velocity; and
output, as output target velocity, a calculation result obtained by calculating the coefficient on the first target velocity; and generate, from the output target velocity, the input control signal relative to velocity of the control target and to output the input control signal as the feedback signal.

4. The learning control device according to claim 1, wherein the target state and the operation result state include at least one of a position of the control target and velocity of the control target.

5. A learning control method comprising:

outputting a coefficient;

generating a feedback signal on the basis of a tracking error for a target state of a control target and outputting the feedback signal, the control target operating in response to an input control signal and outputting an operation result state during a learning trial, the feedback signal being used for causing the operation result state of the control target to track the target state, the feedback signal being generated such that a control target waveform represented by transition of an output signal representing the operation result state becomes a waveform obtained by calculating the coefficient on the whole of a base control target waveform determined in advance;

outputting a calculation result obtained by calculating the coefficient on a correction value, which is stored in a memory and used in the learning trial, to a feedback communication path by which the tracking error according to the operation result state of the control target is input; and updating the correction value stored in the memory in accordance with a signal communicated through the feedback communication path.

6. A computer program product comprising a non-transitory computer-readable recording medium on which programmed instructions are recorded, the programmed instructions causing a computer to execute processing of:

outputting a coefficient;

generating a feedback signal on the basis of a tracking error for a target state of a control target and outputting the feedback signal, the control target operating in response to an input control signal and outputting an operation result state during a learning trial, the feedback signal being used for causing the operation result state of the control target to track the target state, the feedback signal being generated such that a control target waveform represented by transition of an output signal representing the operation result state becomes a waveform obtained by calculating the coefficient on the whole of a base control target waveform determined in advance;

outputting a calculation result obtained by calculating the coefficient on a correction value, which is stored in a memory and used in the learning trial, to a feedback communication path by which the tracking error according to the operation result state of the control target is input; and updating the correction value stored in the memory in accordance with a signal communicated through the feedback communication path.

* * * * *